United States Patent [19]
Smith

[11] Patent Number: 5,924,383
[45] Date of Patent: Jul. 20, 1999

[54] CAT LITTER BOX THRESHOLD

[76] Inventor: Jason T. Smith, 2161 Salem Rd., Watkinsville, Ga. 30677

[21] Appl. No.: 08/944,620

[22] Filed: Oct. 2, 1997

[51] Int. Cl.[6] .................................................... A01K 1/035
[52] U.S. Cl. ........................................... 119/165; 119/847
[58] Field of Search ................................... 119/28.5, 161, 119/165, 170, 847, 485

[56] References Cited

U.S. PATENT DOCUMENTS

| | | | |
|---|---|---|---|
| 3,618,568 | 11/1971 | Breeden | 119/165 X |
| 5,329,879 | 7/1994 | Walton | 119/165 X |
| 5,361,725 | 11/1994 | Baillie et al. | 119/165 |
| 5,448,965 | 9/1995 | McClure | 119/485 X |

OTHER PUBLICATIONS

R. C. Steele Catalog Midsummer 1997 p. 57 Brockport, NY 14420
R. C. Steele Catalog Midsummer 1997 p. 59 Brockport, NY 14420.

*Primary Examiner*—Robert P. Swiatek
*Attorney, Agent, or Firm*—Kennedy, Davis & Kennedy, P.C.

[57] ABSTRACT

A threshold for a covered cat litter box having a side entry comprises a stand supporting an elevated cat landing field. A ramp having a rough litter-dislodging surface extends downwardly from the cat landing field. A barrier is provided for barring cats from jumping onto or off the sides of said ramp. Upon setting the threshold with the ramp accessible to the litter box entry cats may ingress and egress the liter box only via the threshold rough, liter dislodging ramp and landing field which dislodges litter from the paws.

6 Claims, 4 Drawing Sheets

CAT LITTER BOX THRESHOLD

TECHNICAL FIELD

This invention relates to cat litter boxes.

BACKGROUND OF THE INVENTION

Cat litter is widely used today to provide absorbent material for cat waste, i.e. urine and feces. The litter is housed in a litter box or tray. The litter boxes often are covered for aesthetics and odor reduction with entry being had by a side opening in the cover.

A persistent problem with the use of cat litter boxes and trays is that of cats tracking litter onto the floor or carpet when leaving the litter box. Over the period of a day or two a significant amount of unsightly litter typically accumulates near the box. Attempts at training cats to wipe their paws upon leaving the box are useless due to their independent nature.

Accordingly, it is seen that need exists for a device that could substantially eliminate the tracking of litter by cats upon their departure from cat litter boxes. It is to the provision of such that the present invention is directed.

SUMMARY OF THE INVENTION

In a preferred form of the invention a threshold is provided for a covered type cat litter box having a side entry. The threshold comprises a stand supporting an elevated cat landing field, a ramp having a rough litter-dislodging surface extending downwardly from the cat landing field, and a barrier for barring cats from jumping onto or off the sides of the ramp. By setting the threshold with the ramp accessible to the litter box entry, cats may ingress and egress the litter box only via the threshold rough, litter dislodging ramp and the landing field.

In another preferred form of the invention the threshold comprises a runway having a proximal portion positionable adjacent a litter box side entry and a distal portion positionable distally the litter box side entry. A grating is mounted on the runway. A cat barrier is mounted about the runway proximal portion. Thus in exiting the litter box cats must transverse the grating which dislodges liter from the cat paws.

BRIEF DESCRIPTION OF THE DRAWING

FIG. 3 is an end elevational view of the threshold of FIGS. 1 and 2 located distally from the litter box while

DETAILED DESCRIPTION

Figure 1:
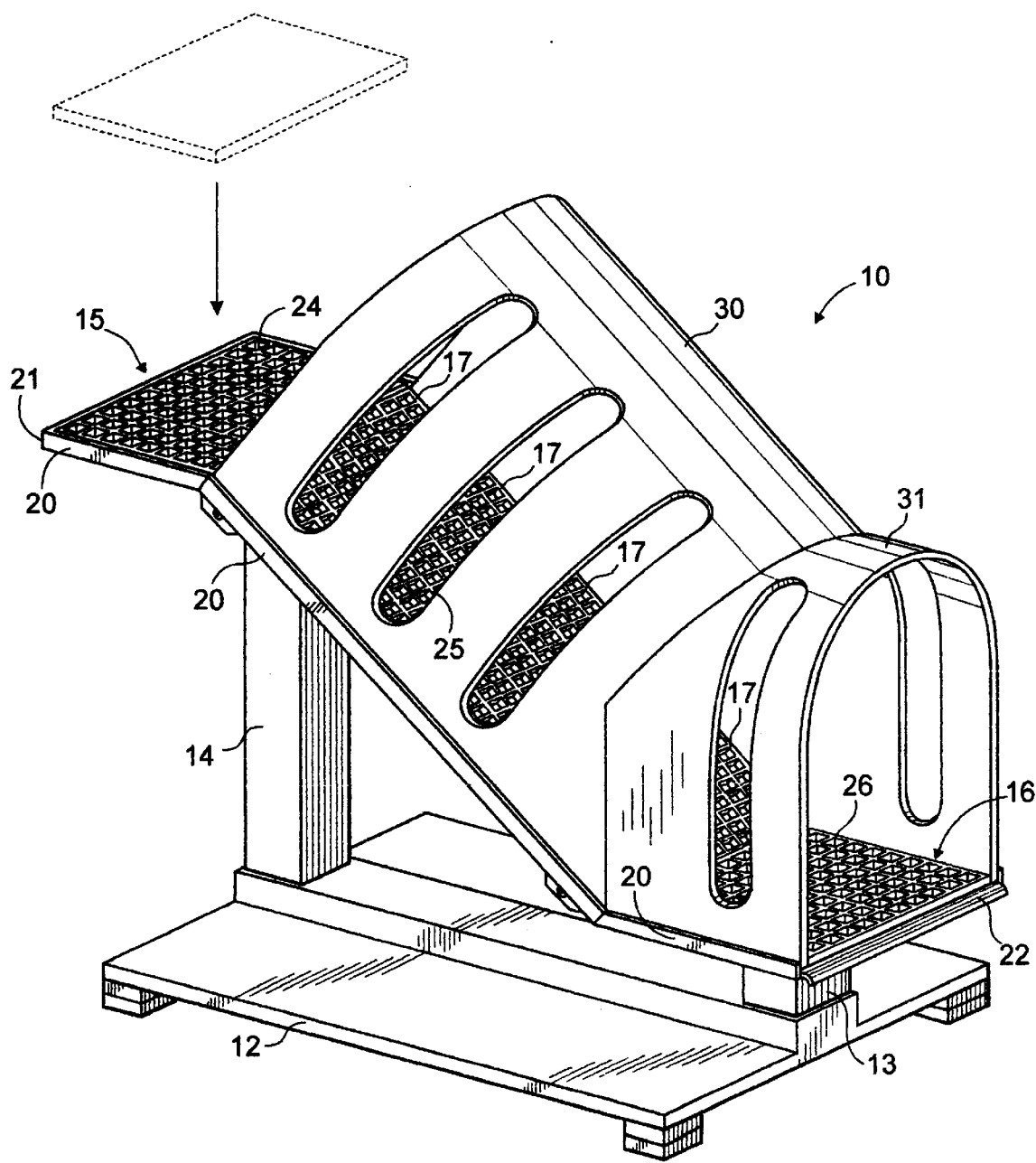
FIG. 1 is a perspective view of a threshold for a cat litter box incorporating principles of the invention in its preferred form.
Figure 2:
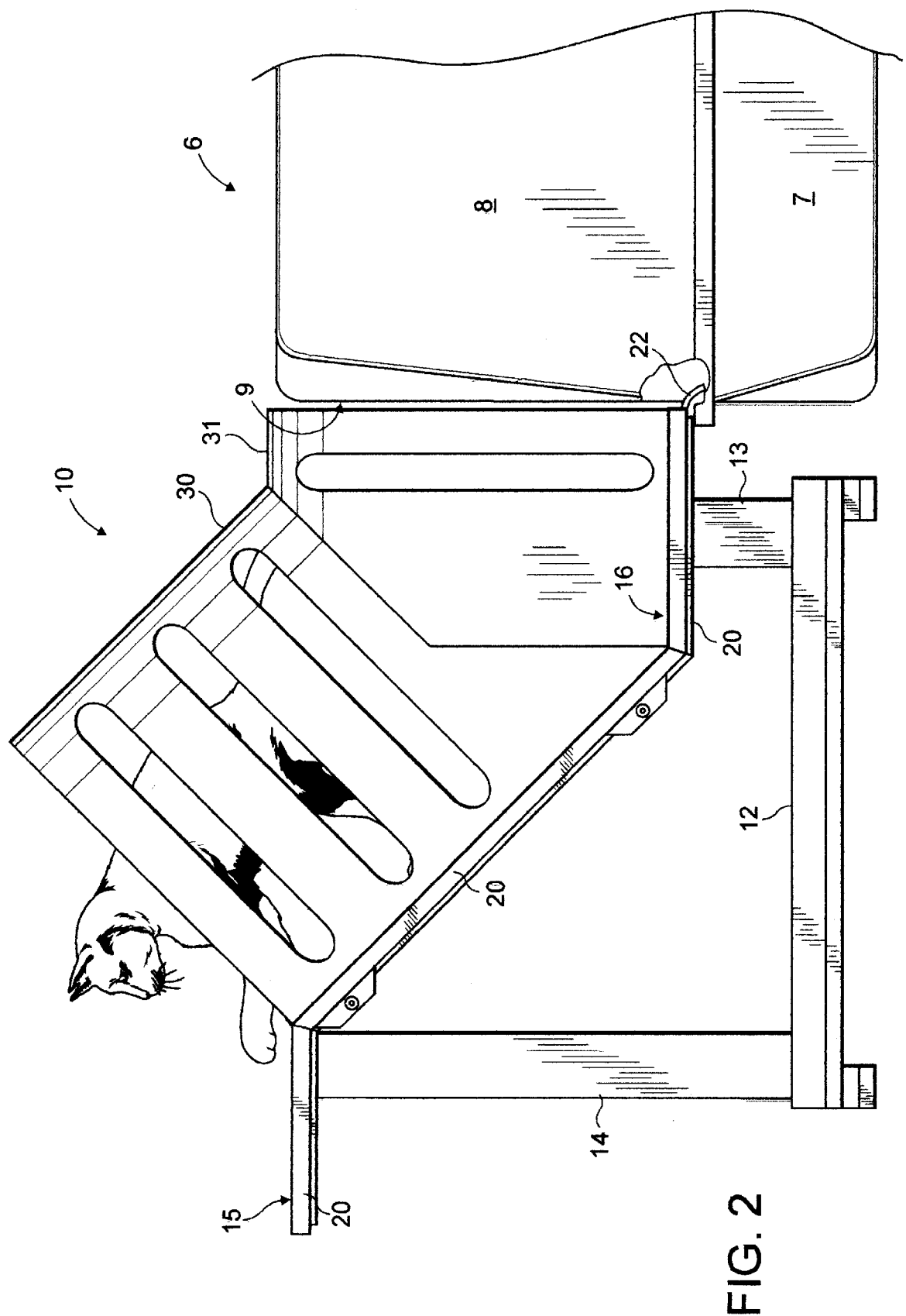
FIG. 2 is a side elevational view of the threshold of FIG. 1 shown with a cat departing a litter box via the threshold.
Figure 3:
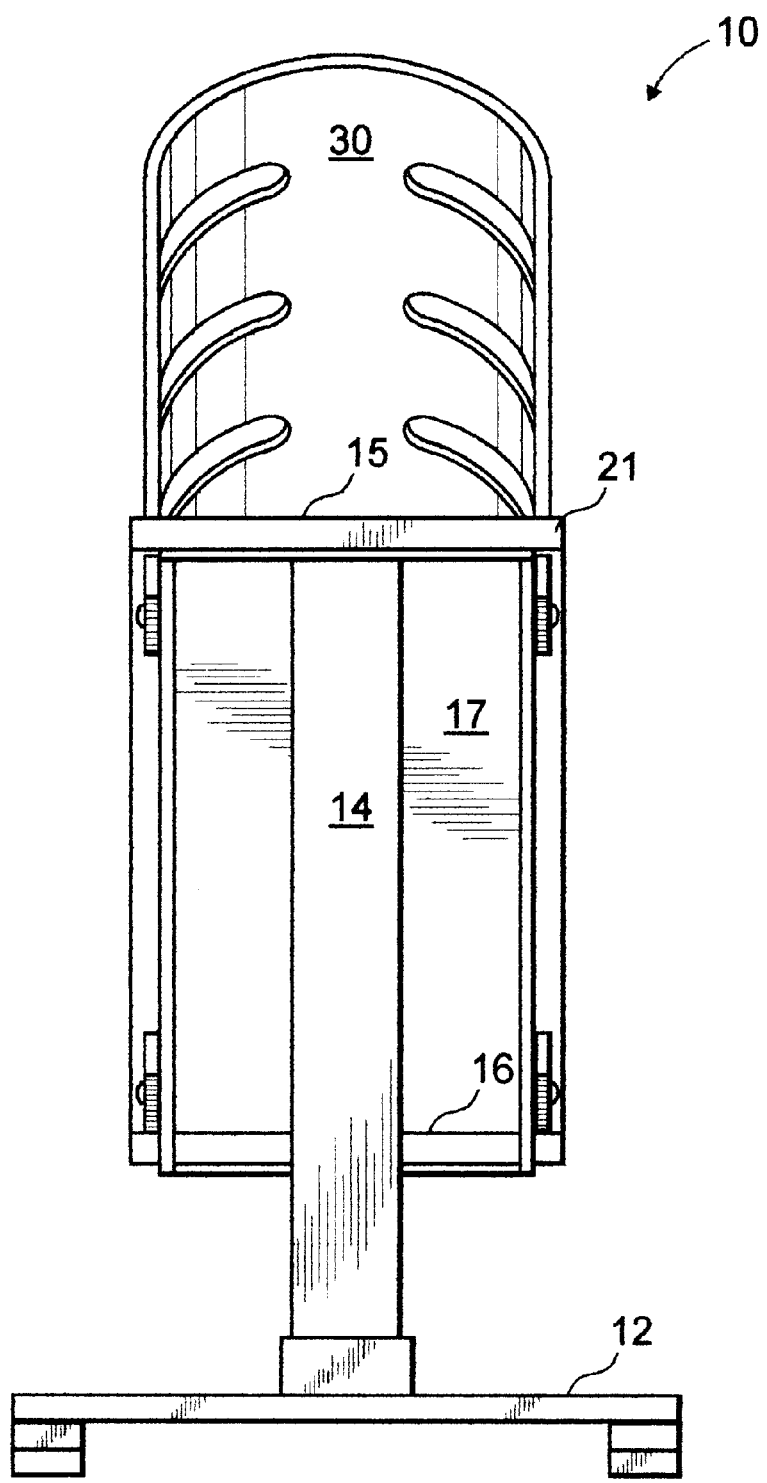
Figure 4:
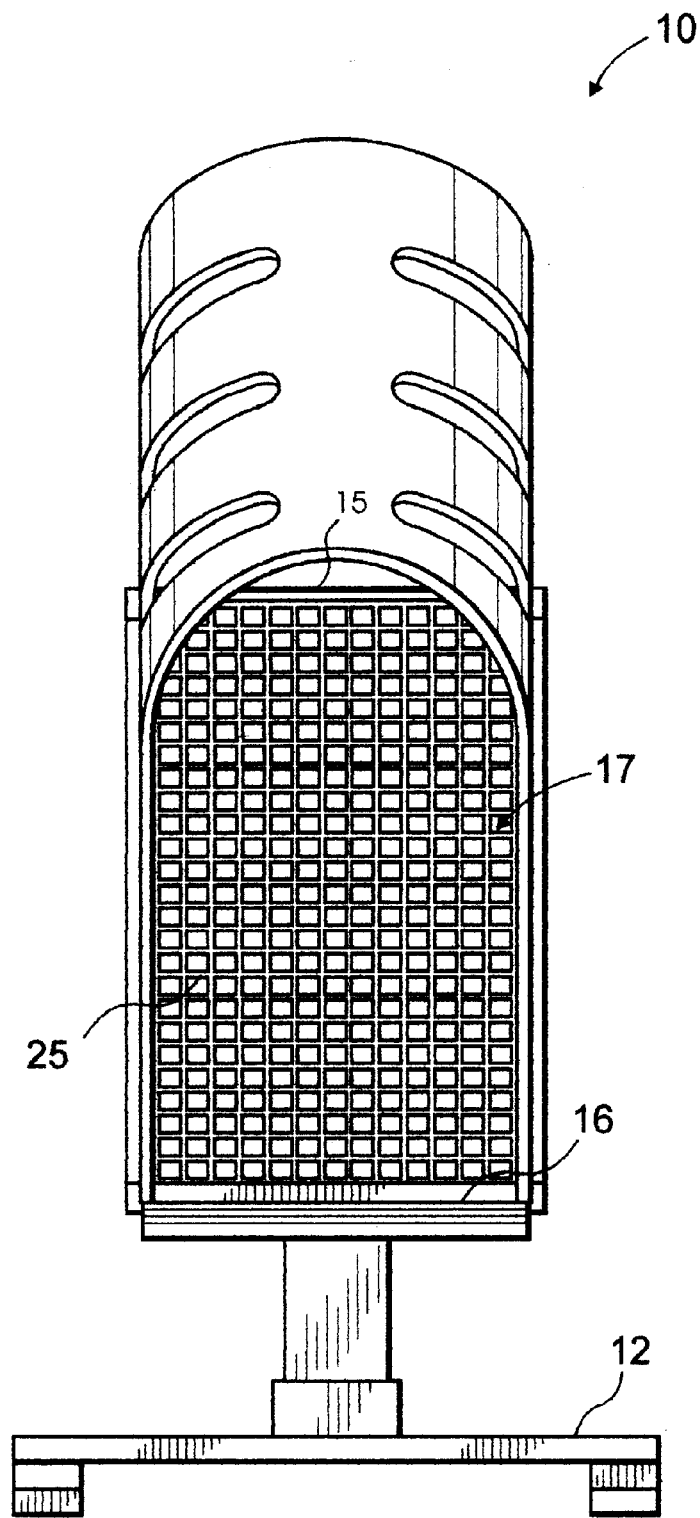
FIG. 4 is an end elevational view of the opposite end thereof located proximally to the litter box.

With reference next to the drawing, there is shown in FIG. 2 a conventional cat litter box 6 having a tray 7 upon which a cover 8 is removably seated. The cover has a side opening 9 providing an entry. A threshold 10 is shown mounted adjacent the side opening 9.

The threshold has a stand 12 with a short forward post 13 and a tall rear post 14. A runway is mounted atop the posts 13, 14. The runway has a level landing field 15, a level step 16 and ramp 17 that extends along an incline between the landing field and step. The landing field, ramp and step each have a solid flat bottom with raised sides 20 that have an unshown ledge located above the bottom. The landing field also has an end wall 21. An end of the step 16 has a downturned lip or catch 22 that overhangs the lip of the cat litter box tray 7 which borders the bottom of the entry 9. In this manner it is releasably attached to the litter box.

The runway also has a grating 24 that is nested within the sides and end wall of the landing field upon its unshown ledge above its flat bottom. Similarly, the ramp has a grating 25 that is set between its sides upon its ledge over the ramp bottom. The stand too has a grating 26 set upon its ledge between its sides. The gratings provide a rough litter dislodging surface for the entire runway while the bottoms and sides of the runway below the gratings provide a chute. Finally, a cover 30 extends over the ramp which merges with a cover 31 that extends over the stand.

In use the threshold is mounted adjacent the litter box with the catch 22 overhanging the rim of the litter box tray 7. A cat may enter the litter box by jumping onto the runway landing field, walking down the ramp, over the step and into the litter box. After attending to its business in the litter box the cat must exit the box through its side entry 9. In doing so it mounts the threshold step 16 which essentially provides an entry floor of a tunnel. From here it climbs the ramp to the landing field as illustrated in FIG. 2. Once on the landing field it is free to jump off the threshold since the cover ends at the end of the ramp.

Upon mounting the threshold step the rough grating surface tends to dislodge cat litter that is on the cat's paw. In climbing the inclined ramp the cat must extend its claws. This action, in conjunction with the roughness of the ramp grating, causes more cat litter to be dislodged. In mounting and jumping from the landing field most any remaining cat litter is dislodged from the paws.

Cat litter dislodged from the paws falls through the ratings and onto the floor of the runway. Periodically this litter may be returned to the litter box by manually tilting and shaking the threshold. When this occurs the threshold floor provides a chute and the litter on the runway floor gravitates back into the litter box. Periodically the threshold may be cleaned by removing and cleaning the gratings and the runway floor.

It thus is seen that a threshold is now provided for a cat litter box that serves to prevent tracking of cat litter out of cat litter boxes. While the threshold has been shown and described in its preferred form, it should be realized that many modifications, additions and deletions may be made thereto without departure from the spirit and scope of the invention as set forth in the following claims.

I claim:

1. A threshold for a covered cat litter box having a side entry, and with said threshold comprising a stand supporting an elevated cat landing field, a ramp having a rough litter-dislodging surface extending downwardly from said cat landing field and a lower end, a step extending from said ramp lower end generally parallel with said cat landing field, and barrier means for barring cats from jumping onto or off the sides of said ramp, whereby upon setting the threshold with the ramp accessible to the litter box entry cats may ingress and egress the litter box only via the threshold rough, litter dislodging ramp and landing field which dislodges litter from the cat's paws.

2. The threshold of claim 1 further comprising means for releasably attaching said step to the litter box.

3. A threshold for a covered cat litter box having a side entry, and with said threshold comprising a stand supporting an elevated cat landing field, a ramp having a rough litter-dislodging surface extending downwardly from said cat landing field, said surface being a grating, and barrier means for barring cats from jumping onto or off the sides of said ramp, whereby upon setting the threshold with the ramp accessible to the litter box entry cats may ingress and egress the litter box only via the threshold rough, litter dislodging ramp and landing field which dislodges litter from the cat's paws.

4. The threshold of claim 3 wherein said ramp has a chute beneath said grating.

5. A threshold for a covered cat litter box having a side entry, and with said threshold comprising a runway having a proximal portion positionable adjacent the litter box side entry which has an inclined section and a distal portion positionable distally the litter box side entry, a grating mounted on said runway covering said runway proximal inclined section, and a cat barrier mounted about said runway proximal portion, whereby a cat in exiting the litter box must trasverse the grating which dislodges litter from the cat's paws .

6. The threshold of claim 5 wherein said runway proximal portion has a generally level section that is covered by said grating.

\* \* \* \* \*